C. W. LEVALLEY.
POWER CHAIN.
APPLICATION FILED NOV. 19, 1908.
971,454.
Patented Sept. 27, 1910.
2 SHEETS—SHEET 2.
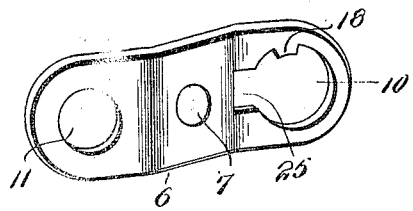
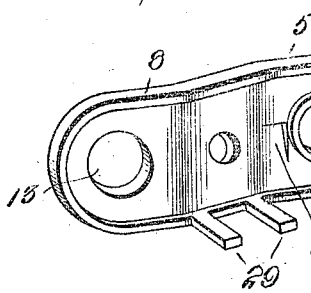
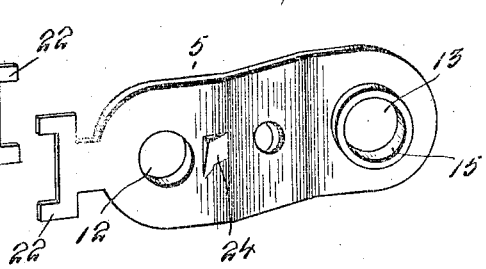
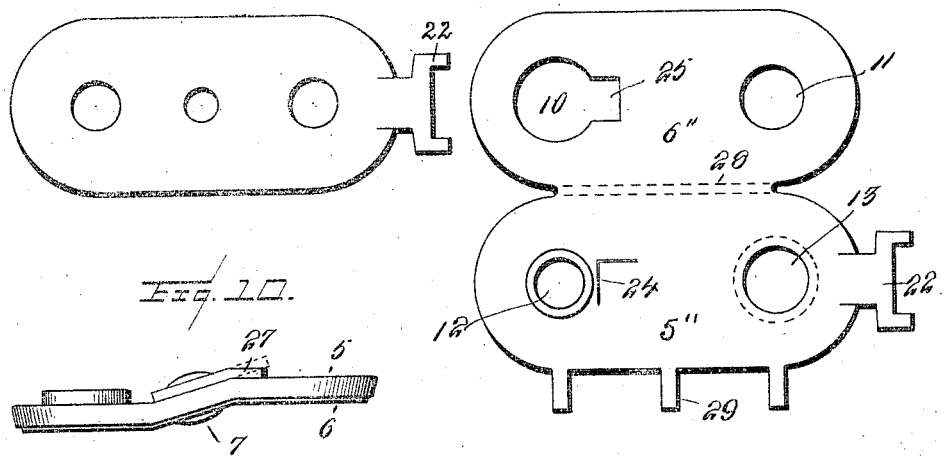
WITNESSES:
Wm F Hoyle
L. C. Brady.
INVENTOR
Christopher W. Levalley
BY
J. S. Barker
Attorney

UNITED STATES PATENT OFFICE.

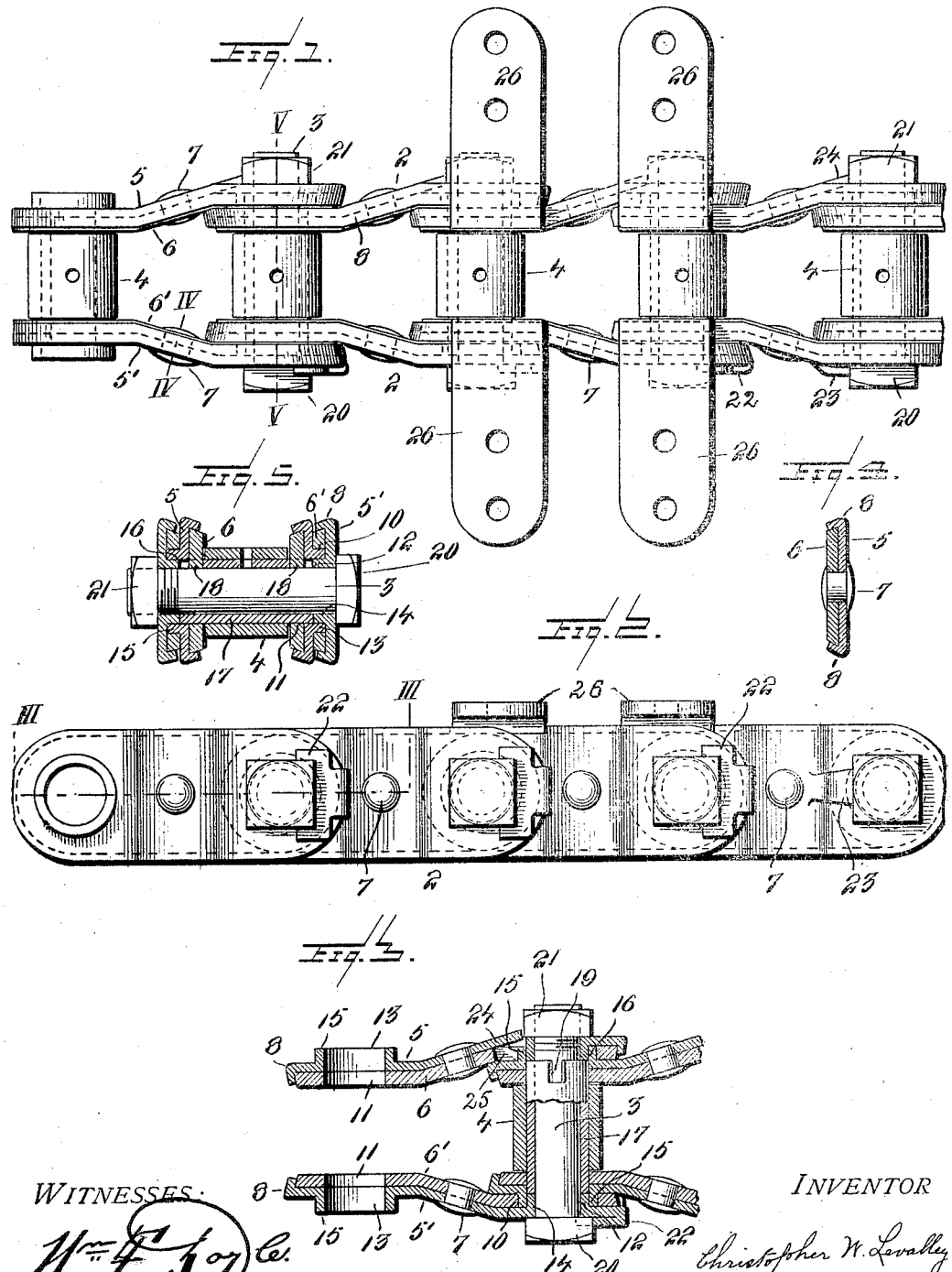

CHRISTOPHER W. LEVALLEY, OF MILWAUKEE, WISCONSIN.

POWER-CHAIN.

971,454.

Specification of Letters Patent.   Patented Sept. 27, 1910.

Application filed November 19, 1908.   Serial No. 463,435.

*To all whom it may concern:*

Be it known that I, CHRISTOPHER W. LE-VALLEY, a citizen of the United States, residing at Milwaukee, in the county of Milwaukee and State of Wisconsin, have invented new and useful Improvements in Power-Chains, of which the following is a specification.

The advantages incident to the use of steel in the manufacture of power chains have long been recognized; but the expense and difficulties of manufacturing all-steel chains, which, as heretofore made, necessitated a large amount of machine work, have precluded their adoption and use for many purposes.

It is the object of the present invention to produce an all-steel chain that can be easily manufactured and is adapted, by its shape and general construction, to immediately take the place of chains now found in common use, the links of which are made of cast metal; which chain can be easily manufactured from stock readily obtained in the open market and the parts of which can well be formed by means of cutting and shaping dies.

I have, in the accompanying drawings, illustrated my invention as being embodied in a power chain adapted to serve as a driving belt or connection between sprocket wheels, and have chosen for the purpose of illustration to represent a chain each link of which is adapted to be engaged by the teeth of the sprocket wheels. The parts of the chain, especially those subject to tensile strains, are preferably of a homogeneous nature being formed of soft steel, which, after being shaped, is case-hardened for the purpose of increasing the wearing qualities of the chain and its strength.

In the accompanying drawings, Figure 1 is a plan view of a short section of chain embodying my invention. Fig. 2 is an edge view of the same. Fig. 3 is a horizontal sectional view through the chain taken on the line III—III of Fig. 2. Fig. 4 is a transverse sectional view through one of the side bars, taken on the line IV—IV of Fig. 1. Fig. 5 is a transverse sectional view through one of the joints of the chain taken on the line V—V of Fig. 1. Fig. 6 is a detached view of one of the members of a side bar. Fig. 7 is a perspective view of the other member of a side bar. Fig. 8 is a perspective view of the member illustrated in Fig. 7 but viewed from the opposite side. Fig. 9 is a plan view of the blank from which the part shown in Figs. 7 and 8 is made. Fig. 10 is an edge view of a single side bar of a link illustrating a feature not shown in the other views. Fig. 11 is a plan view of a blank from which is constructed a link somewhat different from that shown in the other views.

In Figs. 1 and 2 I have represented the present invention as embodied in a chain of well-known form, in its general features; that is, each link has side bars, 2, 2, and a tubular end bar between the side bars, and such links are united by pintles, 3. In the chain illustrated the side bars are duplicates of each other in their general features of construction, and the overlapping portions at the opposite ends of each bar set respectively outward and inward relative to a line passing longitudinally through the side bars of the chain and parallel with the length thereof. The side bars of the links are provided with interlocking projections at the chain joints adapted to relieve the pintles in a large measure from the strain upon the chain. As stated, each link is provided at one end with a tubular cross bar through which passes the connecting pintle and on this cross or end bar may be supported a wearing sleeve, roller, or wheel, 4.

Each side bar is of composite construction, being formed of two pieces of soft steel suitably shaped and united to form the bar. The two parts or members constituting one side bar of a link are designated 5, 6, and those constituting the other bar, 5′, 6′, the bars on opposite sides of the links shown being of slightly different construction, though in some forms of chains they will be identical. While the two members of the side bars may be alike in thickness, and for the lighter forms of chain this is not undesirable, I usually prefer to form the outer members, 5, of thinner material than the inner ones, 6. The latter are of simpler construction and are principally depended upon for giving strength to the chain. On the other hand, the outer members are formed with or carry the means for locking the pintles and the nuts thereon, and are provided with the interlocking means situated at the joints of the chain; and, not being of so simple construction as the other members, are preferably formed of thinner material, as being more easily workable and brought to the desired shape. The two members of a side bar are similar in general outline and are connected face to face by rivets, 7, or other suitable securing means. The edges of the outer member may be turned over to form flanges, 8, arranged to overlap the edges of the other part; and these overlapping flanged edges may be to a greater or less extent prolonged to form lips, 29, as represented in Fig. 7, that may be folded over the inner face of the part, 6, to hold it against the part 5, the lips, 29, supplementing the rivets, 7, or being depended upon in lieu thereof to hold the parts together.

The thicker side bar piece, 6, is perforated near its ends for the passage of the pintle, the perforations being designated, 10, 11, the former, 10, being the larger. The other part, 5, is also perforated for the passage of the pintle, a perforation, 12, being concentric with that at 10 in the other part but of considerable smaller size, while an aperture, 13, at the other end of the piece preferably corresponds in size with the aperture, 11, in piece, 6. In the form of links shown the apertures, 10, 12, are formed in the outlying overlapping parts of the side bar, and those designated 11 and 13 in the inlying parts.

A hub or annular flange, 14, surrounds the aperture, 12, and extends inward from the face of the part, 5, and is arranged to set within the aperture, 10, leaving a seat, 16, surrounding such hub.

15 is a hub or annular flange surrounding the aperture, 13, and extending outward from the face of the piece, 5. This hub or flange is adapted to rest in the recess or seat, 16, in the side bar of another link, when the links are coupled to form a chain.

17 indicates the tubular end bar of a link uniting the opposite side bars, though formed separate therefrom. It is a piece of steel tubing, though a piece of sheet steel rolled into tubular form might be used. Its opposite ends rest in the apertures, 11, 13, and I prefer that it should be so mounted as not to be free to rotate relative to the side bars of the link. This result may be variously effected. The method I have chosen is to notch the ends of the tubular cross bar, 17, and to provide the side bars with lugs or projections, 18, adapted to engage with the notches, 19, thus locking these parts together, and causing the former to serve as a spacing device for holding the bars a proper distance apart.

The connecting pintle is preferably in the form of a headed bolt 20 screw-threaded to receive a nut, 21. It passes through the perforated overlapping side bars and the hollow end bar, which latter it should fit quite closely. In order to hold the pintle from rotation in its seat I utilize an integral part of the outer, thin member, 5, of the side bar. The blank from which this member is formed is provided at one end with a wrench-shaped projection, 22, which is adapted to be folded over upon the outer face of the part in position to engage with the head of the pintle and hold it from rotation. Instead of the pintle-holding projection, 22, a projection, 23, may be struck up from the body of the piece, 5, in position to engage with and hold the pintle head. The outer member of the opposite side bar is provided with means for locking the nut, 21. Such nut lock or holder is designated 24 and preferably constitutes an integral part of the side bar member, 5. In the latter is formed an L-shaped slit and the triangular piece between the legs of the cut is forced out to constitute the lock, 24. The inner, thicker member, 6, may be formed with an aperture, 25, lying opposite the nut lock or holder, 24, and arranged to permit a punch or other tool to be employed to force the nut lock outward into holding position, should it from any cause become forced down flat or into such position as not to properly engage with and hold the nut, 21.

Special links, that is, links with attachments or constructed to receive attachments for special uses, can easily be provided by specially shaping certain parts of such special links. In Figs. 1 and 2 the thicker parts or members, 6, 6', of the side bars of two links are represented as being formed with wings, 26, adapted to have attached to them cross slats such as are commonly employed in conveyers.

The wearing rollers, 4, which may be of any desired size, are supported upon the sleeves or tubular end bars, 17, and are preferably free to turn thereon. They are provided with oil holes for lubricating the joints of the chain when desired. These rollers may serve as spacers for the side bars.

In Fig. 10 I have represented a special form of nut lock especially adapted to chains in which the pintles are riveted, and where a screw-threaded removable bolt is employed as a pintle only at those points along the chain where it is desired to provide for separating it. It consists of a small bar or piece of metal, 27, secured to the side bar by one of the rivets, 7, that unites the two members which compose the side bar. The end of the nut lock, 27, is adapted to bear against one face or edge of the nut, 21, and hold it from turning. Whenever it becomes necessary to turn the nut upon the bolt the nut-locking bar, 27, is lifted into the position indicated in dotted lines, by means of a chisel or other suitable tool, where it remains until it becomes necessary to again lock the nut, when it is forced down by a hammer. The bar 27 is formed of such material as will permit it to be thus bent many times without injury to its effiency. An attachment like that at 27 may be employed to engage with the head of the bolt and hold it against turning.

It has already been stated that for the lighter forms of chains the composite side bars may be constructed of parts of similar thickness. When this is the case it is convenient to have the two parts or members integral, shaping them from a blank like that indicated in Fig. 11. Here the portion of the blank designated 5″ constitutes the outer member of the side bar and the part 6″, the inner member. These two parts are united by a web, 28, and in them are respectively formed the pintle openings, which are designated by reference numerals corresponding with those employed in illustrating the other forms of the invention. Along one free edge of the blank are formed a series of tongues, 29, adapted to be bent over the other edge when the two parts are folded together face to face.

I have not attempted to illustrate or describe all the forms or modifications of my invention as those skilled in the art will readily understand how it may be modified to suit the requirements of manufacture met with in making chains of various sizes and forms.

After the parts from which the links are formed have been shaped, for which purpose simple punching or cutting dies only are required, they are case-hardened in any suitable manner. This case-hardening may take place before the shaped parts are assembled, or after the chain has been formed, as may be found most expedient. The case-hardening process adds materially to the strength and durability of the chain without increasing the cost of manufacture very much; but to be satisfactory, the several parts of the chain should be of a homogeneous nature. This I secure by forming the parts, as stated, from soft steel which can readily be obtained of uniform grade, and is easily worked.

What I claim is:—

1. A power chain formed of pintle-connected links, the side bars of which are of composite construction being formed of sheet metal pieces united together, and the side bars of the links having at the joints interlocking projections concentric with the axes of articulation.

2. A power chain formed of pintle-connected links, the side bars of which are each formed of two pieces of metal united, the pieces being of different thicknesses and formed with projections adapted to interlock with the side bars of other links at the joints of the chain when the links are united.

3. A power chain formed of pintle-connected links, the side bars of which are each formed of two pieces of shaped metal united to each other, the said pieces being of different thicknesses and the thinner pieces being formed with hubs surrounding the pintle openings therein and arranged to constitute interlocking connections between united links.

4. A power chain formed of pintle-connected links, the side bars of which are each formed of two pieces of shaped sheet metal united together, the two said pieces being of different thicknesses and each link having a tubular end bar uniting the side bars and seated in the thicker pieces of the side bars.

5. A power chain formed of pintle-connected links, the side bars of which are each formed of two pieces of sheet metal cut to shape and united, and the end bars of which are separate from the side bars but seated in one pair of opposite pieces, the other pair of opposite pieces being formed with projections adapted to constitute interlocking connections at the joints of the chain.

6. A power chain formed of pintle-connected links, the side bars of which are each formed of two pieces of sheet metal cut to shape and united, the said pieces being of different thicknesses, and each link having a tubular end bar for uniting the side bars, it being seated in the thicker pieces of the side bars, and the thinner pieces thereof being formed with projections adapted to constitute interlocking connections at the joints of the chain.

7. A power chain formed of pintle-connected links, the side bars of which are each formed of two pieces of sheet metal cut to shape and united, the said pieces being of different thicknesses, and each link having a tubular end bar seated in the thicker pieces of the side bars, these thicker pieces near their ends opposite the end bar having formed in them relatively large perforations, and the thinner pieces of the side bars being formed with hubs surrounding the openings through which the pintles pass, the hub at one end of a piece being turned outward and that at the other end inward, and the outturned hub being arranged to enter the said large perforation in the thicker piece of the side bar, and the inturned hub being arranged to interlock with an outturned hub of another link with which it is connected by a pintle.

8. A power chain formed of pintle-connected links, the side bars of which are of composite nature, being each formed of two pieces of metal cut to shape and united, one of the outer pieces of each link carrying means for holding the pintle against turning.

9. A power chain formed of pintle-connected links, the side bars of which are of composite nature, being each formed of two pieces of metal cut to shape and united, the outer piece of one side bar of each link being formed with a holding piece for preventing the pintle turning, the holding piece being formed from the metal of the side bar piece.

10. A power chain formed of pintle-connected links, the side bars of which are of composite nature, being each formed of two pieces of sheet metal cut to shape and united, the outer piece of one side bar of the link being provided with holding means for preventing the pintle from turning, and the outer piece of the other side bar with a nut-locking device.

11. A power chain formed of pintle-connected links, the side bars of which are of composite nature, being each formed of two pieces of sheet metal cut to shape and united, these pieces being of unequal thicknesses, the outer thinner piece of a side bar being formed with a nut-locking part for the nut of a connecting pintle, and the thicker piece united therewith being formed with an aperture located behind the nut-locking part, whereby the latter may force it into operative position.

12. A power chain formed of pintle connected links, the side bars of which are formed of two pieces of sheet metal cut to shape and united, each link having a tubular end bar uniting the side bars and seated in the inner pieces of the side bars, and means to prevent the tubular end bar from turning in the side bars.

13. A power chain formed of pintle connected links, the side bars of which are formed of two pieces of sheet metal cut to shape and united, each link having a tubular end bar uniting the side bars and seated in the inner pieces of the side bars and arranged to space them apart, and means to prevent the tubular end bar from turning in the side bars.

CHRISTOPHER W. LEVALLEY.

Witnesses:
WM. C. FRYE,
V. I. KLOFANDA.